United States Patent [19]

Yeh

[11] Patent Number: 4,743,278
[45] Date of Patent: May 10, 1988

[54] PASSIVE PROPELLANT MANAGEMENT SYSTEM

[75] Inventor: Tso-Ping Yeh, Fremont, Calif.

[73] Assignee: Ford Aerospace & Communications Corporation, Detroit, Mich.

[21] Appl. No.: 874,971

[22] Filed: Jun. 16, 1986

[51] Int. Cl.[4] .............................................. B01D 19/00
[52] U.S. Cl. ....................................... 55/159; 55/182; 137/154; 220/85 S
[58] Field of Search ......................... 55/159, 182, 392; 137/154, 590; 220/1 B, 5 A, 85 S

[56] References Cited

U.S. PATENT DOCUMENTS

| | | | |
|---|---|---|---|
| 3,854,905 | 12/1974 | Balzer et al. | 55/159 |
| 3,923,188 | 12/1975 | Lake | 220/20 |
| 4,168,718 | 9/1979 | Frosch et al. | 137/590 X |
| 4,272,257 | 6/1981 | Ellion et al. | 55/38 |
| 4,399,831 | 8/1983 | Robert | 137/154 |
| 4,553,565 | 11/1985 | Kerebel | 137/590 |
| 4,595,398 | 6/1986 | Orton et al. | 55/182 |

OTHER PUBLICATIONS

DeBrock et al., "A Survey of Current Developments in Surface Tension Devices for Propellant Acquisition", *Journal of Spacecraft and Rockets*, vol. 8, No. 2, Feb. 1971, pp. 83-98.

*Primary Examiner*—Charles Hart
*Attorney, Agent, or Firm*—Edward J. Radlo; Keith L. Zerschling

[57] ABSTRACT

A passive propellant management system for a spacecraft liquid propellant tank (1) comprises several preferably V-shaped channels (2) which communicate liquid propellant from regions within the tank (1) to an outlet port (8), which expels liquid propellant but not pressurant gas. A liquid/bubble chamber assembly (9) couples the channels (2) with the outlet port (8). The channels (2) comprise relatively open portions (11) and relatively closed portions (10). In the relatively open portions (11), liquid is retained in a gap (12) between open ends of the V channels (2) and the inner wall of the tank (1). In the relatively closed portions (10), a screen, mesh or perforated plate (14) covers the open end of the V channels (2), intermediate the V channels (2) and the inner wall of the tank (1). The placement of the relatively open and closed portions (11, 10, respectively) is intentionally preselected based upon mission requirements. Where pressurant gas ullage is expected to be present, e.g., during periods of high g, relatively open portions (11) are used. Where liquid propellant is expected to be present, e.g., during periods of relatively low g, relatively closed portions (10) are used. The liquid/bubble chamber assembly (9) comprises a liquid trap (27) and bubble trap (28), which operate synergistically with each other and with the channels (2) to provide optimum liquid flow during all phases of the spacecraft mission.

16 Claims, 8 Drawing Sheets

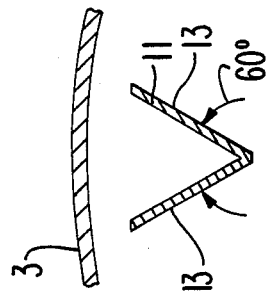
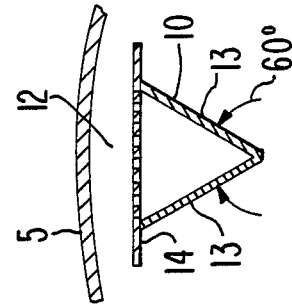
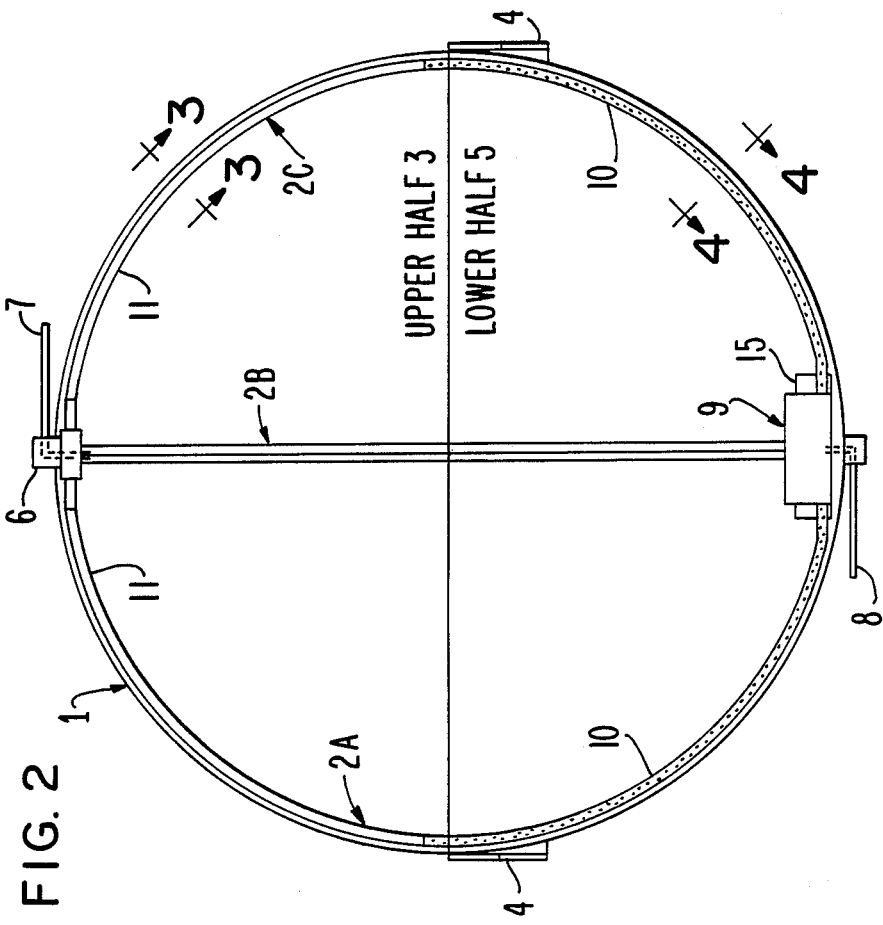

FIG. 7
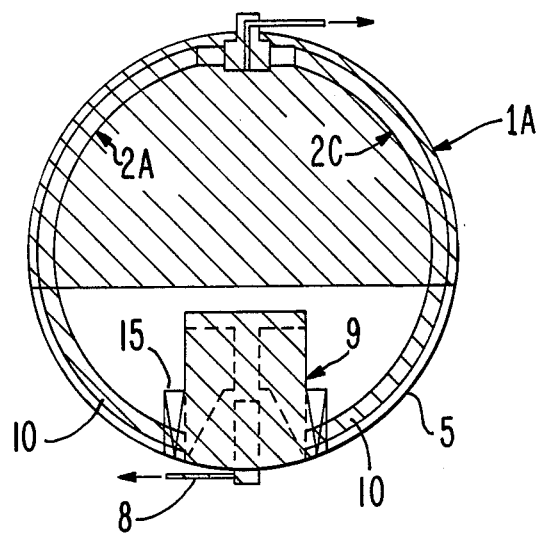
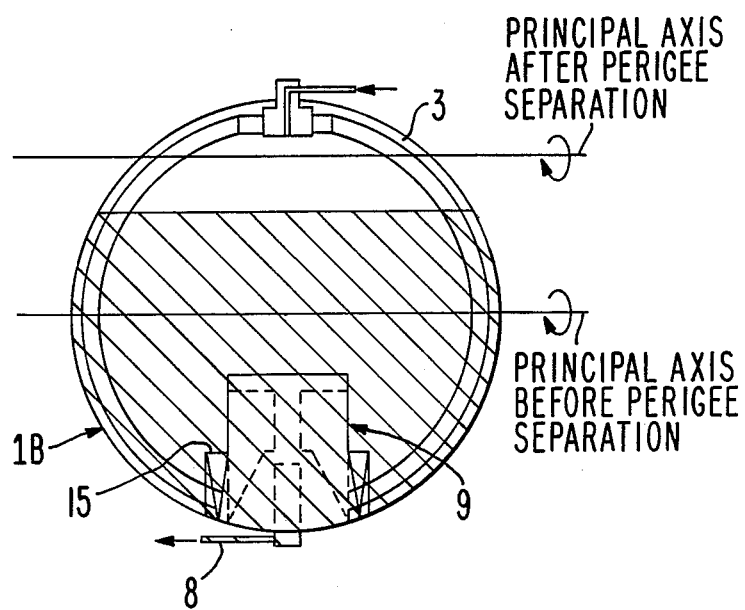
PRINCIPAL AXIS
AFTER PERIGEE
SEPARATION
PRINCIPAL AXIS
BEFORE PERIGEE
SEPARATION FIG. 9
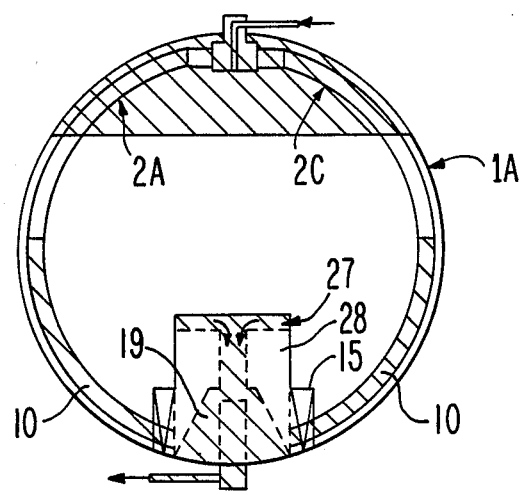
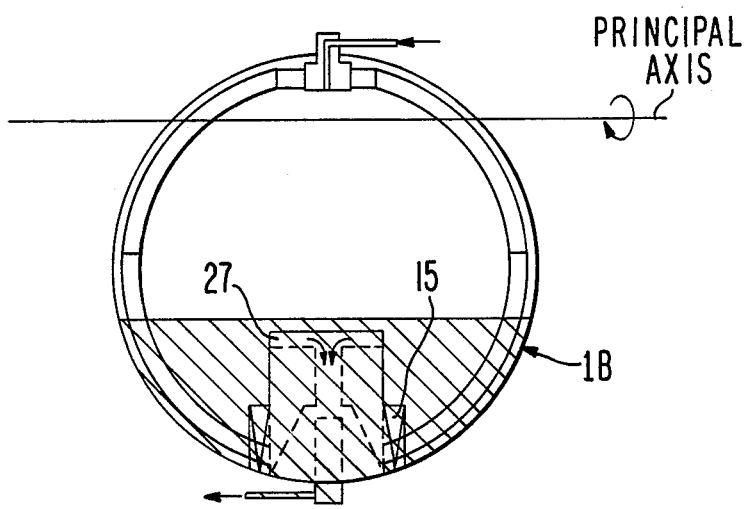

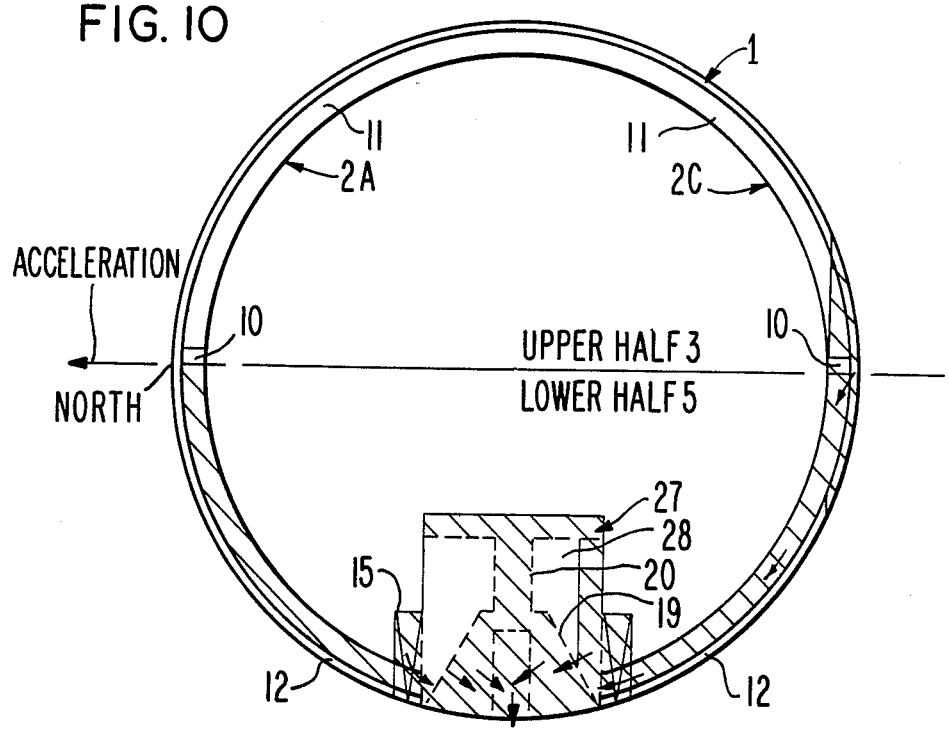
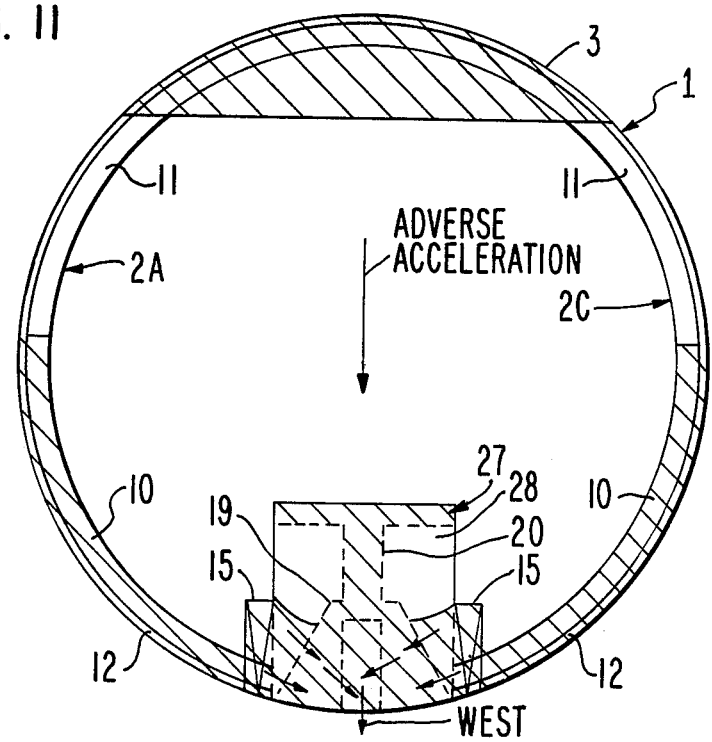

PASSIVE PROPELLANT MANAGEMENT SYSTEM

TECHNICAL FIELD

This invention pertains to the field of expelling liquid propellant but not pressurant gas from a liquid propellant tank on board a spacecraft.

BACKGROUND ART

DeBrock et al., "A Survey of Current Developments in Surface Tension Devices for Propellant Acquisition", *Journal of Spacecraft and Rockets*, Vol. 8, No. 2, February 1971, pp. 83–98, shows a number of propellant management devices for spacecraft liquid propellant tanks. For example, FIG. 4 shows a system of screened galleries, formed using rectangular channels, extending throughout the interior of the tank. In the present invention, screens or other relatively closed portions 10 of liquid communication channels 2 do not extend all the way into the upper half 3 of the tank 1; and the liquid communication channels 2 are preferably V-shaped.

U.S. Pat. No. 3,923,188 shows another type of rectangular-cross-section screened gallery propellant management system (PMS) in which the screens extend all the way into the upper reaches of the tank. Unlike the present invention, the reference device has no flat spin recovery capability and no capability for adverse acceleration conditions when the propellant quantity is small.

U.S. Pat. No. 4,272,257 shows a propellant management system having liquid-vapor separators inserted into galleries. The separators, which serve the same role as screens, extend all the way into the upper half of the tank. This presents the same disadvantages as with those prior art devices using screens, which disadvantages are overcome by the present invention as will be explained infra. The reference device does not disclose a flat spin capability as in the present invention. In col. 1, lines 35–36, the reference patent mentions triangular-shaped port openings in prior art screened gallery PMS's.

U.S. Pat. No. 4,399,831 shows a propellant management system having rectangular-cross-section screened galleries extending all the way into the upper half of the tank. Chamber 27 surrounding solid 26 is used for a bubble trap, but this structure does not perform all of the functions, such as liquid communication, as bubble trap assembly 9 of the present invention.

U.S. Pat. No. 4,553,565 shows a propellant management system using vane channels (FIGS. 5A and 5B). The channels have less propellant retention and acquisition capability than the V-shaped channels 2 described in the present specification. The reference device does not have a flat spin recovery capability of a spinup capability as in the present invention.

DISCLOSURE OF INVENTION

The present invention is a propellant management system (PMS) for a liquid propellant tank used on board a spacecraft. The instant PMS can accommodate many different spacecraft maneuvers. A hollow tank (1) contains a liquid propellant and a pressurant gas ullage. An outlet port (8) is situated in a half (5) of the tank (1) associated with the outlet port (8). Several elongated preferably V-cross-section channels (2) communicate liquid propellant to the outlet port (8) from interior regions of the tank (1), including those in that half (3) of the tank (1) not associated with the outlet port (8). The channels (2) are relatively more open in portions of the tank (1) where pressurant gas ullage is expected to be present, e.g., during high-g spacecraft maneuvers, compared with regions where liquid propellant is expected to be present. Because of this, during high g maneuvers, the ullage advantageously does not descend into relatively closed portions (10) of the channels (2), where it could be trapped.

BRIEF DESCRIPTION OF THE DRAWINGS

These and other more detailed and specific objects and features of the present invention are more fully disclosed in the following specification, reference being had to the accompanying drawings, in which:

FIG. 2 is a side sectional view of the tank 1 of FIG. 1;

FIG. 3 is a sectional view of a relatively open portion 11 of V-channel 2C from FIG. 2 viewed along viewlines 3—3;

FIG. 4 is a sectional view of a relatively closed portion 10 of V-channel 2C from FIG. 2 viewed along viewlines 4—4;

FIG. 7 is a side sectional view of two tanks 1A, 1B of the FIG. 1 variety, illustrating distribution of liquid propellant for a spin about the spacecraft's principal axis, for the case where tanks 1A, 1B are more than 50% full of propellant;

FIG. 9 is a side sectional view of two tanks 1A, 1B of the FIG. 1 variety, illustrating distribution of liquid propellant for a spin about the spacecraft's principal axis, for the case where tanks 1A, 1B are less than 50% full of propellant;

FIG. 10 is a side sectional view of tank 1 of FIG. 1 showing distribution of propellant during a north stationkeeping maneuver; and FIG. 11 is a side sectional view of tank 1 of FIG. 1 showing distribution of propellant during a west stationkeeping maneuver.

BEST MODE FOR CARRYING OUT THE INVENTION

Three-axis stabilized spacecraft, including satellites, require propulsion systems with a propellant management system (PMS) to provide gas-free propellant delivery on demand for all orbital maneuvers throughout the entire mission. The PMS must also be designed to provide high expulsion efficiency to minimize the propellant "residuals", i.e., that propellant which is unavailable for propulsion.

Active PMS's using bellows, bladders, or diaphragms were formerly in vogue. Passive PMS's such as the one described herein, which operate on the basis of surface tension, have replaced active PMS's for many spacecraft applications. Vane and screened gallery PMS's are the two most commonly used surface tension PMS's. The most serious drawback of the screened gallery PMS is that pressurant gas is accumulated and retained (trapped) inside the gallery system. This results in performance degradation and eventual loss of capillary retention capability. In addition, the screened gallery is expensive and difficult to fabricate. Vane PMS's, on the other hand, while not exhibiting the gas entrapment problem, have solely open liquid communication vanes, which severely limits their liquid propellant retention capability.

The present invention overcomes these difficulties by providing an improved passive propellant acquisition and management system. The improved system minimizes the trapped gas problem, while offering better propellant retention, acquisition, and pumping capabilities. Propellant residuals are kept to a minimum. Furthermore, the present invention exhibits an increase in propellant retention capability when operating under adverse acceleration conditions, and can accommodate flat spin, spinup, lateral acceleration, and other maneuvers.

Figure 1:
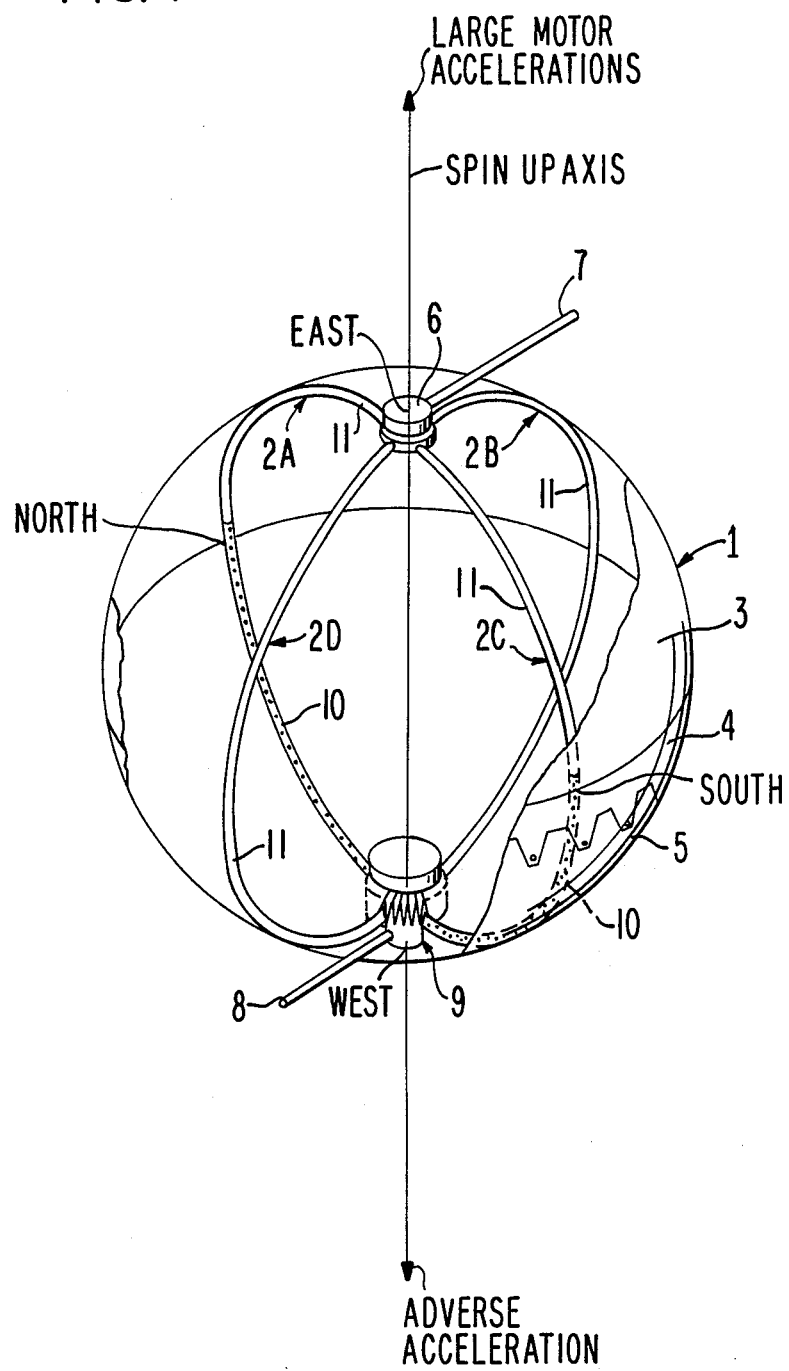
FIG. 1 is an isometric partially broken-away overview of a spacecraft liquid propellant tank 1 that utilizes the present invention.

As shown in FIG. 1, the invention resides in a hollow, closed propellant pressure tank (vessel) 1. Tank 1 may be made of steel or titanium. In the illustrated embodiment, tank 1 has the form of a sphere comprising upper and lower hemispherical sections 3, 5, respectively; and a diameter of 40". Tank 1 could just as readily have an elongated cylindrical or some other shape. Tank 1 includes a pressurant inlet 7, a propellant outlet 8 (which also serves as a propellant inlet for loading), four elongated V-shaped liquid communication channels 2, and a liquid/bubble trap assembly 9.

The four V-shaped channels (2A through 2D) are arranged in pairs of opposed channels. Channels 2A and 2C comprise a first pair, and channels 2B and 2D comprise a second pair. The plane of the first pair is orthogonal to the plane of the second pair, whereby each individual channel 2 is mutually orthogonal to its two adjacent channels 2. The channels 2 are curved to conform generally to the curvature of the inenr wall of tank 1.

Four is an optimum number for the channels 2, because this enables said channels 2 to cover all the axes. However, another number of channels 2 could be used, such as three. Introducing unnecessary channels 2 into the tank 1 would unnecessarily increase the weight, which is always an important consideration for spacecraft applications.

The propellant retention system includes a liquid/bubble trap assembly 9 situated at the junction of the four channels 2 and the propellant outlet 8. The liquid/bubble trap assembly 9 is constructed using perforated sheet metal having preferably equilateral triangular holes, as will be more fully described below.

In operation, the V-channels 2 acquire and convey liquid propellant to the liquid/bubble trap assembly 9 during zero-g and low-g phases of the spacecraft's mission. The liquid/bubble trap assembly 9 also functions as a retention device to maintain the position of the liquid propellant in the region of outlet 8 when operating under said zero-g and low-g conditions. The system also prevents propellant from moving away from outlet 8 during adverse acceleration conditions, thereby providing a continuous supply of gas-free propellant.

The V-shaped channels 2 are easier to fabricate and less expensive than the complicated, screened rectangular galleries of the prior art, and exhibit better propellant acquisition. For a given cross-sectional area, V-shaped channels 2 provide a 10–15% increase in liquid pumping capability over screened rectangular channels. The intant PMS provides a reduction in propellant residuals compared with rectangular gallery PMS's. Screens are eliminated from upper portions 11 of channels 2; consequently, serious problems encountered in the screened gallery systems of the prior art, such as gas trapped inside the galleries, propellant evaporation off the screens, etc., are minimized.

Channels 2 provide better propellant retention capability compared to the vane PMS's of the prior art.

The interior of tank 1 that is occupied by gas and not by liquid propellant is termed the "ullage". The pressurant gas is typically helium, pressurized to about 230 psi. During an apogee motor burn in the illustrated satellite application, an external pressurant tank and pressure regulator are used to maintain constant pressure in tank 1 during the apogee burn. After apogee burn, no new pressurant gas is introduced into tank 1.

The spacecraft typically has two tanks 1A, 1B that are virtually identical. Tank 1A is for the liquid fuel, which may be mono-methylhydrazine (MMH). Tank 1B is for the liquid oxidizer, which may be nitrogen tetroxide. (Tank 1 depicted in FIG. 1 is for either fuel or oxidizer.) In the illustrated satellite embodiment, fuel tank 1A is situated above the principal axis of the satellite. The principal axis passes through oxidizer tank 1B, which is situated just below fuel tank 1A (FIGS. 7 and 9). The principal axis is sometimes known as the flat spin axis of the stable axis.

The tank 1 hemispheres 3, 5 are welded together by means of attachment ring 4. The channels 2 are mechanically coupled to upper hemisphere 3 by means of a channel retainer 6 centered therein.

The type of passive propellant management system illustrated herein is not needed for a spin stabilized spacecraft because centrifugal force can be used to expel the liquid propellant from the tanks. Therefore, the specific application illustrated in this specification is a three-axis stabilized geosynchronous satellite. Even with such a satellite, however, the satellite is often made to spin, e.g., just prior to firing of its perigee motor, for purposes of imparting angular momentum stiffness to the satellite. For such an application, tank 1 is arranged within the satellite so that the spinup axis of the satellite passes through channel retainer 6 and liquid/bubble trap assembly 9 as illustrated in FIG. 1. Large motor accelerations, e.g., caused by firing of the perigee or apogee motor, have a direction as illustrated; during such a maneuver, liquid propellant is forced to the lower regions of tank 1. The illustrated adverse acceleration (see FIGS. 1 and 11) is that associated with a west stationkeeping maneuver. The north, south, east, and west faces of tank 1 for the illustrated satellite application are also shown in FIG. 1.

Liquid propellant is filled into tank 1 via propellant inlet/outlet 8, so that gas will not be trapped in the vicinity of liquid/bubble trap assembly 9. Tank 1 is typically filled between 75% and 92% with liquid propellant.

FIG. 1 illustrates a preferred embodiment in which channels 2B and 2D consist solely of relatively open channel portions 11. On the other hand, channels 2A and 2C comprise relatively open portions 11 as well as relatively closed portions 10, which are schematically illustrated in FIGS. 1 and 2 by dots. Said relatively closed portions 10 occupy those regions of channels 2A and 2C within lower hemisphere 5, plus small contiguous regions of channels 2A, 2C within upper hemisphere 3. The function of relatively closed portions 10 is to maintain continuous liquid flow during north-south stationkeeping maneuvers, flat spin, and spinup procedures.

As illustrated in FIGS. 3 and 4, there is a small gap (0.25" towards the top ends of closed portions 10 tapering down to about 0.1" towards the bottom ends of closed portions 10 for the exemplary satellite) between the open end of the V of each V-channel 2 and the inside wall of tank 1. These gaps may be maintained by mechanical spacers interspersed along each channel 2. For each relatively closed channel portion 10, as depicted in FIG. 4, this gap forms a refillable liquid reservoir 12, as surface tension tends to keep liquid therein. The gap size of reservoir 12 is based on the magnitude of adverse acceleration expected during the mission. The higher the adverse acceleration, the smaller the gap must be. If the gap is very small, it become mechanically difficult to fabricate. For the exemplary satellite, the adverse acceleration is 0.0009 g. Reservoirs 12 have a much better propellant retention capability than those associated with the prior art vane liquid communicators.

FIGS. 3 and 4 show that each V-channel 2 is made by joining two elongated metal plates 13, forming an angle of 60° in the illustrated embodiment. Thus, the liquid path is substantially in the shape of an equilateral triangle. For the exemplary satellite, the opening between the open end of plates 13 is 1", i.e., the equilateral triangles have legs that are an inch long.

Alternative to the use of the equilateral triangular shape, plates 13 can be made to have an angle of less than 60°, and the resulting liquid communication path has an isosceles triangular cross-section. For the same cross-sectional area, the isosceles triangle moves the liquid faster than the equilateral triangle, because its perimeter is bigger. However, such a channel 2 is heavier than the equilateral triangular channel 2.

FIG. 4 shows one technique by which the relatively closed portion 10 may be made: a thin metal foraminous (perforated) plate 14 is placed over the open portion of the V. The holes in plate 14 are numerous and small (on the order of 0.0015 inch diameter). The desired hole size depends upon spin-generated acceleration and propellant load. The shape of a hole is chosen so that the hole has as small a hydraulic radius as possible for a given cross-sectional area. This maximizes the retentive power of plate 14. An equilateral triangular hole has a smaller hydraulic radius than a circular or rectangular hole of the same cross-sectional area, but a greater hydraulic radius than an isosceles triangular hole. However, an equilateral triangular hole is easier to fabricate than an isosceles triangular hole. Therefore, equilateral triangular holes are used for the exemplary satellite. The perforated plates 14 are formed simply and inexpensively from materials such as titanium or steel by photoetching or laser drilling.

Alternative to the use of a foraminous plate 14, a screen or mesh could cover the openings of the V-channels to create the relatively closed portions 10.

Figure 5:
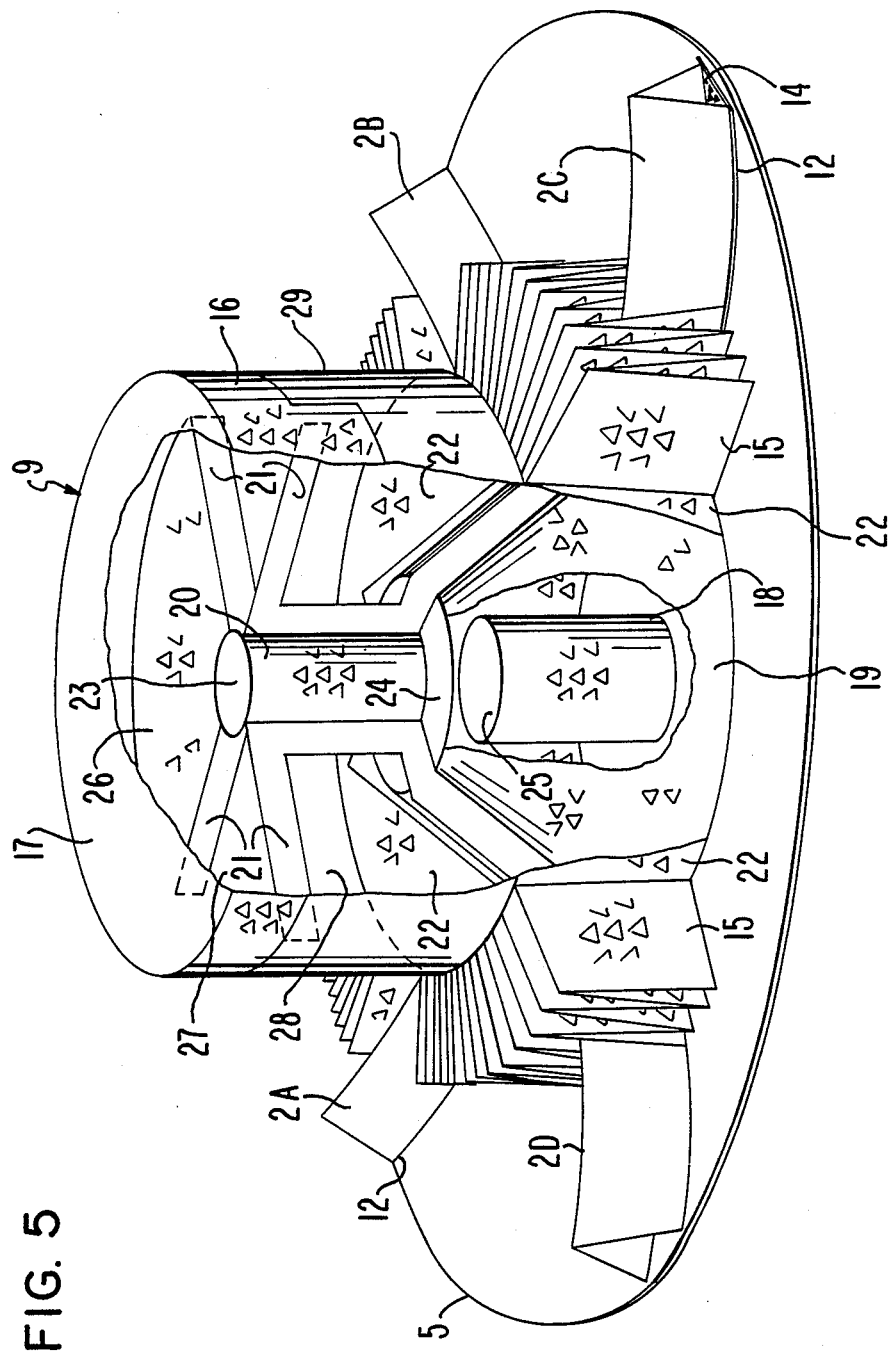
FIG. 5 is an isometric partially broken-away view of bubble trap assembly 9 of tank 1 of FIG. 1.

FIG. 5 illustrates details of liquid/bubble trap assembly 9. The liquid paths formed by V-channels 2 pass into cylindrical portion 29 of assembly 9 via foraminous band 22, which forms the bottom annular portion of cylinder 29. Cylinder 29 is bounded on the bottom by hemisphere 5 and on the top by plate 17. Plate 17 is closed, to counteract liquid loss during maneuvers entailing adverse acceleration, and also to provide structural stiffness.

The interior of cylinder 29 comprises liquid trap 27 plus bubble trap 28, both of which are non-refillable.

Bulk space liquid trap 27 comprises the space within foraminous frustoconical upstream gas arrestor 19, foraminous cylindrical communication tube 20, and an upper disk portion. The upper disk portion of liquid trap 27 is that space formed between top plate 17, foraminous vane-top plate 26, and a wholly foraminous portion of annular gas venting window 16. Liquid trap 27 is a non-refillable closed trap. It retains propellant at outlet 8 during spin-mode operation, and provides propellant for stable spin recovery. A flat spin (spin about the principal axis) may be commanded for the exemplary satellite during periods of emergency. During such an emergency maneuver, the upper disk portion of liquid trap 27 desirably stores propellant. Cylinder 20 is made thin so that bubble trap 28 can be situated between upper and lower portions of the liquid trap 27. Upstream gas arrestor 19 is made narrow at the top so it can communicate with tube 20, and wide at its botom to complete an uninterrupted liquid flow path at the bottom of tank 1 all the way from channels 2 to outlet port 8.

Metallic liquid communication vanes 21 provide mechanical support to assembly 9, as well as a liquid communication path among the various components of liquid trap 27. The upper circular-cross-section end 23 of cylindrical communication tube 20 is open.

The purpose of gas venting window 16 is to squeeze out gas when tank 1 is filled with liquid initially. Foraminous portions of window 16 extend down cylinder 29 a bit below vane-top plate 26. This extended lower region of window 16 covers some but not all of the circumference of cylinder 29.

Bulk space bubble trap 28 is bounded by cylinder 29, plate 26, cylindrical communication tube 20, and upstream gas arrester 19. Bubble trap 28 is not refillable.

Arrester 19, whose open end surrounds downstream gas arrester 18, acts as a backup bubble trap. Cylindrical foraminous downstream gas arrester 18 surrounds outlet 8, and acts as a bubble trap of last resort. The lower circular-cross-section end of arrestor 18 is open and communicates with outlet 8. The holes in arresters 18 and 19 increase the area available to act as a barrier to gas entry. The upper plate 25 of downstream gas arrester 18 and the upper plate 24 of upstream gas arrester 19 are closed for purposes of counteracting undesired liquid flow during maneuvers entailing adverse acceleration.

External refillable trap 15 is a foraminous accordion-like structure formed around band 22 at the intersection of channels 2. Trap 15 is used primarily during the west stationkeeping maneuver, and is optional, since reservoirs 12 may be sufficient for this naneuver. Refillable trap 15 feeds propellant to nonrefillable liquid trap 27; retains sufficient propellant under adverse accelerations to satisfy maneuver requirments; and refills under conditions of zero g.

As stated previously, items 15, 16, 18, 19, 20, 22, and 26 are foraminous. They have preferably three different hole sizes. Their holes have shapes such as to minimize the hydraulic radius for a given cross-section, and thereby maximize retention capability. As a practical matter, the holes are equilateral triangular in shape. This provides more liquid retention capability than with circular or rectangular holes, although less than for the harder-to-fabricate isosceles triangular holes. For the exemplary satellite, the largest holes (about 0.06" diameter if they were circles) are in refillable trap 15. The second largest holes (about 0.004" diameter if they were circles), are in band 22. Items 16, 18, 19, 20, and 26 have holes that would be about 0.002" in diameter if they were circles; these holes are relatively small so liquid will be retained within cylinder 29 during spinup maneuvers (see FIG. 6).

The instant propellant management system has been designed so that each tank 1 may experience lateral accelerations without adverse consequences. Lateral accelerations occur when the exemplary satellite is launched by the U.S. space transportation system (space shuttle). In that case, a lateral acceleration of about 4.6 g acts on tank 1. The lateral acceleration vector has a direction from the center of tank 1 through channel 2D. Because of this, channel 2D is designed to comprise solely a relatively open portion 11 throughout its length, for the same reason that the upper regions of all channels 2 comprise relatively open portions 11 on account of the perigee maneuver: the lateral acceleration of 4.6 g places the ullage about the entire length of channel 2D (but not about any other channel 2, because none of the propellant has been expanded at this point in the mission). This ullage would be sufficient to cause gas breakdown within channel 2D even if it were relatively closed. This gas would be trapped in channel 2D. So fabricating channel 2D of just a relatively open portion 11 avoids this problem, and furthermore, advantageously saves weight.

In the illustrated embodiment, channel 2B also consists exclusively of a relatively open portion 11, thus saving additional weight. This is possible because the relatively closed portions 10 of channels 2A and 2C are adequate for providing the requisite liquid pumping capability.

FIGS. 6-11 illustrate the functioning of the instant propellant management system during several different maneuvers of the exemplary satellite. In FIGS. 6-11, liquid propellant is represented by cross-hatchings; liquid flow is denoted by arrows; and the relative size of liquid/bubble trap assembly 9 has been exaggerated for clarity.

Figure 6:
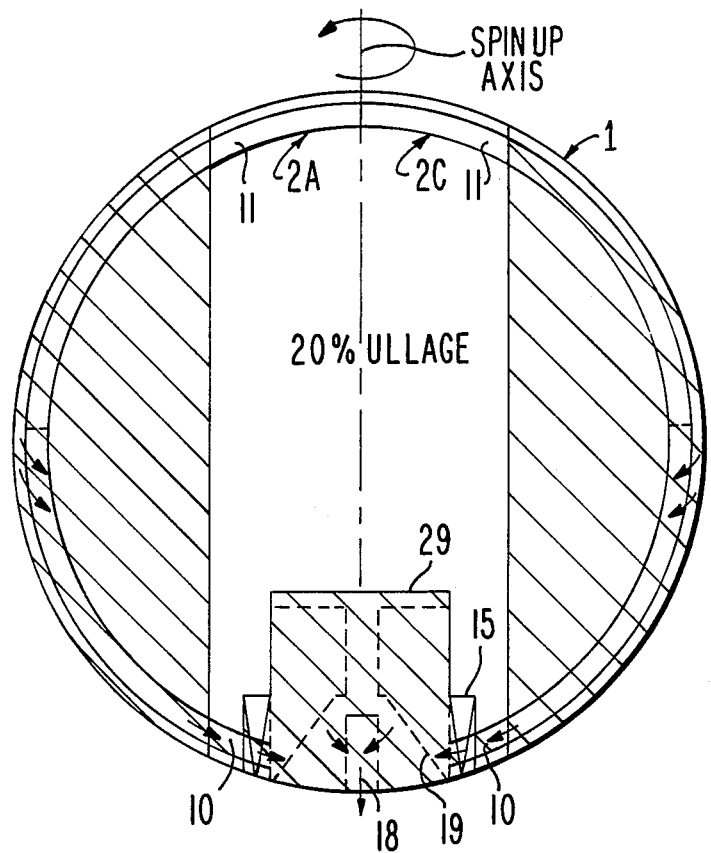
FIG. 6 is a side sectional view of tank 1 of FIG. 1 showing the distribution of liquid propellant during a spinup maneuver.

FIG. 6 pertains to spinup and nutation control. The satellite spins up to about 36 RPM around its spinup axis for about 20 minutes. 211 cubic inches of propellant is consumed from each of the two tanks 1. The maximum acceleration generated is 0.32 g. The faster the spin rate and the less propellant within the tank 1, the greater the need for liquid retention capability. The relatively closed portions 10 of channels 2A and 2C provide enough retention capability that gas breakdown does not occur across the gas/liquid interface in lower hemisphere 5. Liquid does not leave cylinder 29 of assembly 9 because the holes therein are sufficiently small.

After spinup, the satellite experiences a perigee motor burn. The liquid propellant is forced towards lower hemisphere 5. Because of this phenomenon, the instant propellant management system is designed so that the upper regions of all V-channels 2 comprise relatively open portions 11. This is because during the perigee motor burn, the acceleration is so great that even if the upper regions of the channels 2 were relatively closed, gas would be injected into said channels 2 anyway. The gas would be trapped, and would be very difficult to remove later. With the use of relatively open portions 11, the liquid flows back into and along channels 2 in these upper regions anyway, by capillarity. Furthermore, eliminating screening or perforated plates 14 in these upper regions of channels 2 advantageously saves weight.

After perigee motor burn, the satellite transitions to a stable spin of about 15 RPM around its principal axis (which passes through the satellite's center of mass), and the perigee motor separates from the satellite. During this maneuver, no flow is required from the propellant tanks 1. This maneuver is illustrated in FIG. 7, in which tank 1A is the fuel tank and tank 1B is the oxidizer tank. This maneuver is not a problem for the oxidizer tank 1B, because the ullage is in the upper hemisphere 3 of said tank 1B. However, this maneuver places a great deal of strain on the retention capability of the channels 2 within the fuel tank 1A, because the ullage is in the lower hemisphere 5 of tank 1A. Because of this great need for retention capability, the lower regions of at least two of the channels, in this case 2A and 2C, comprise relatively closed portions 10.

After the perigee motor separates, the center of mass, and hence the principal axis, moves upwards, but it still lies within oxidizer tank 1B.

After the satellite undergoes flat spin, it despins to a three-axis stabilized mode. At this time, each tank 1 is more than 50% full. The geometry of the liquid within tanks 1 is the same as that illustrated in FIG. 7. Within the fuel tank 1A, channels 2 provide direct communication to the bulk propellant at the top of the tank 1A for continuing the supply of propellant to outlet port 8.

Figure 8:
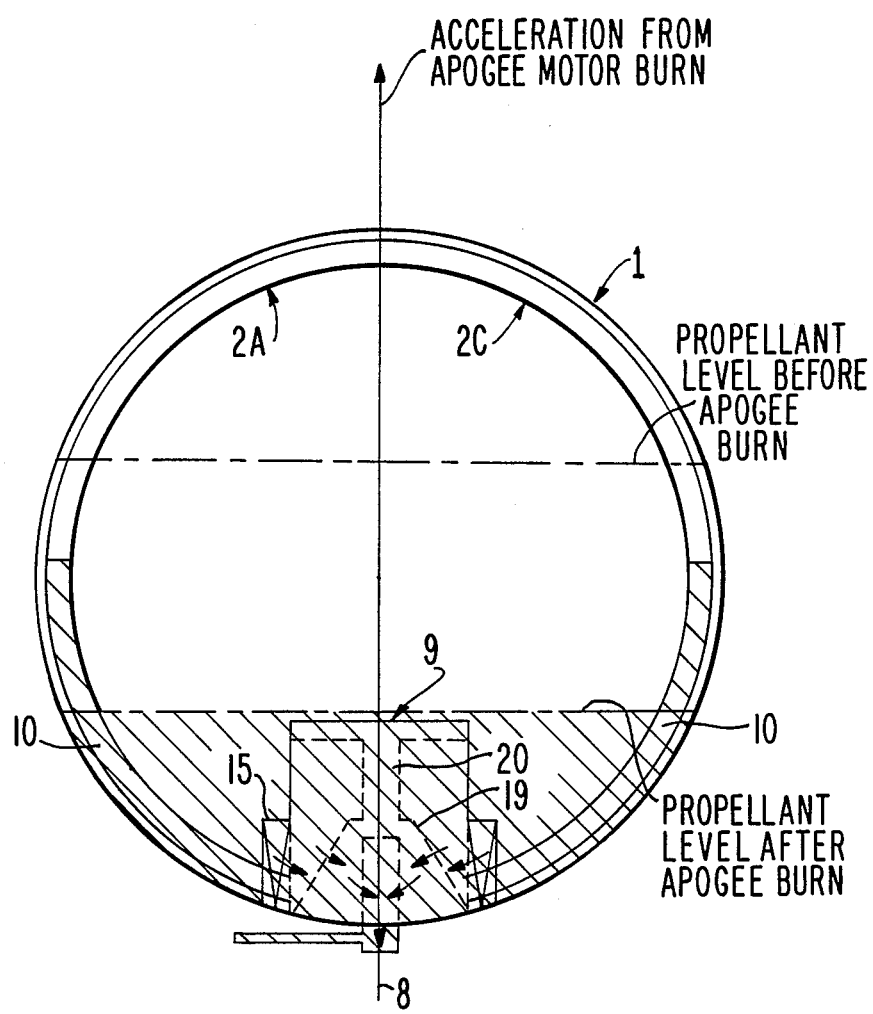
FIG. 8 is a side sectional view of tank 1 of FIG. 1 showing distribution of liquid propellant following an apogee kick motor firing maneuver.

FIG. 8 illustrates the movement of liquid propellant just after apogee motor burn. The propellant is settled over outlet 8 by axial acceleration along the spinup axis. As the burn progresses, the top regions of the channels 2 are no longer submerged in propellant. The relatively closed portions 10 of the channels 2 must prevent gas from entering the system. About 85% of the total supply of propellant is consumed during the apogee burn.

FIG. 9 illustrates the despin of the satellite to a three-axis stabilized mode after apogee burn. At this point, each tank 1 is less than 50% full. The fuel within tank 1A is initially provided from external refillable trap 15 and upstream gas arrester 19. As this gets depleted, the fuel is eventually supplied from the upper disk portion of liquid trap 27. Gas enters bubble trap 28. Within oxidizer tank 1B, oxidizer is supplied from liquid trap 27 and is displaced by the inflow of the bulk propellant.

FIG. 10 illustrates a north stationkeeping maneuver of the satellite after it is in geosynchronous orbit. (A south stationkeeping maneuver would be identical except reversed.) For this maneuver, there is a small (about 0.005 g) lateral acceleration, which passes from the center of the tank 1 through channel 2A. In FIG. 10, it is seen that channel 2C is experiencing a puddling of liquid extending just above the midline of the tank 1. It is for this reason that the relatively closed portions 10 of channels 2A and 2C are made to exend a bit above the midline of the tank 1; this enables the liquid that puddles above the midline duing north-south stationkeeping maneuvers to be retained within the system for subsequent use during the mission. During these maneuvers, propellant withdrawn from liquid trap 27 is displaced by inflow from channels 2A and 2C. Propellant retained in one quadrant of refillable trap 15 (in the case of north stationkeeping, the leftmost quadrant) can also be added to the supply of required flow. As the satellite reverts to a zero g condition after completion of the maneuver, liquid propellant refills channels 2, reservoirs 12, and external trap 15. The refill time of reservoir 12 and external trap 15 is typically less than 25 minutes.

Finally, FIG. 11 illustrates the west stationkeeping maneuver, which places on the satellite an adverse acceleration in the direction illustrated. Capillary feed from refillable trap 15 and reservoirs 12 provides the required flow. The isolated liquid in the upper hemisphere 3 is later captured by the channels 2.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A propellant management system for a spacecraft liquid propellant tank, comprising:
   a hollow tank containing a liquid propellant and a pressurant gas ullage;
   an outlet port, centered in a half of the tank, for expelling from the tank liquid propellant but not pressurant gas, wherein relatively large operational accelerations pass through the outlet port;
   several elongated channels for communicating liquid propellant to the outlet port from regions within the tank, including a half of the tank opposed to the outlet port half; wherein
   the channels are relatively more open within regions of the tank where pressurant gas ullage is expected to be present during operation of the spacecraft, compared with regions within the tank where liquid propellant is expected to be present during operation of the spacecraft.

2. The system of claim 1 wherein, during high acceleration propulsion maneuvers of the spacecraft, the ullage does not descend into relatively closed regions of the channels.

3. The system of claim 1 wherein at least one of the channels is as open within the outlet port half of tank as it is within the half of the tank opposed to the outlet port.

4. The system of claim 3 wherein the spacecraft is a satellite launched from a space shuttle; and
   as the satellite experiences a translational acceleration during launch of the space shuttle, the ullage is confined to a relatively open portion of one of the channels.

5. The system of claim 1 wherein at least two of the channels are as relatively closed in a small region within the half of the tank opposed to the outlet port and contiguous with the outlet port half of the tank as they are in the outlet port half of the tank.

6. The system of claim 1 wherein each channel comprises two elongated members joined along an edge so as to form a V-channel having an open end facing but spaced apart from an inside wall of the tank.

7. The system of claim 6 wherein the members form an angle of 60° with respect to each other.

8. The system of claim 6 wherein the members form an angle of less than 60° with respect to each other.

9. The system of claim 1 wherein the channels comprise relatively open portions and relatively closed portions; and
   each relatively closed portion comprises a structure having a cross-section in the shape of a V and covered by a foraminous plate.

10. The system of claim 1 wherein the channels comprise relatively open portions and relatively closed portions; and
    each relatively closed portion comprises a structure having a cross-section in the shape of a V and covered with a screen.

11. The system of claim 1 further comprising a bubble trap assembly situated at the intersection of the channels and the outlet port.

12. The system of claim 11 wherein the spacecraft is a satellite; and
    after the satellite has achieved its orbit, a gas bubble forms in the bubble trap assembly; and
    liquid propellant is retained within relatively closed portions of the channels in the outlet port half of the tank.

13. The system of claim 1 wherein the outlet port is aligned along a spinup axis around which the spacecraft spins for purposes of angular momentum stiffness; and
    during times when the spacecraft is spinning about the spinup axis, relatively closed portions of channels within the outlet port half of the tank retain liquid propellant and communicate with liquid propellant in regions within the tank that are remote from the spinup axis.

14. The system of claim 1 wherein the output port is aligned along a spinup axis around which the spacecraft spins for purposes of angular momentum stiffness,
    the principal axis of the spacecraft is orthogonal to the spinup axis; and
    during times when the spacecraft spins about the principal axis, relatively closed portions of channels within the outlet port half of the tank retain liquid propellant and communicate with liquid propellant in the half of the tank opposed to the outlet port.

15. A liquid and bubble trap assembly for use within a spacecraft's liquid propellant tank, comprising:
    a hollow tank having an opening for expelling liquid propellant to regions outside the tank; and
    a liquid trap disposed within the interior of the tank and surrounding the opening, said liquid trap comprising three contiguous sections, as follows:
    proximate the opening, a first frustoconical section that is relatively wide at a first end surrounding the opening and relatively narrow at a second end offset from the opening in a direction towards the interior of the tank;
    coupled to the first section, a second generally cylindrical section having its long axis aligned with the frustocone of the first section; and
    coupled to the second section, a third generally disk-shaped section having its central axis aligned with the cylindrical axis of the second section.

16. The assembly of claim 15 wherein the three sections are enclosed within a partly perforated outer cylinder having a cross-section coterminous with that of the third section, wherein regions within the cylinder that are part of the liquid trap constitute a bubble trap.

* * * * *

UNITED STATES PATENT AND TRADEMARK OFFICE
CERTIFICATE OF CORRECTION

PATENT NO. : 4,743,278

DATED : May 10, 1988

INVENTOR(S) : Tso-Ping Yeh

It is certified that error appears in the above-identified patent and that said Letters Patent are hereby corrected as shown below:

In Col. 10, line 62, delete "are part" and insert in place thereof --are not part--.

Signed and Sealed this

Twenty-fifth Day of October, 1988

Attest:

DONALD J. QUIGG

*Attesting Officer*     *Commissioner of Patents and Trademarks*